(12) United States Patent
Shiromura et al.

(10) Patent No.: US 9,573,501 B2
(45) Date of Patent: Feb. 21, 2017

(54) VEHICLE SEAT

(75) Inventors: Hiroki Shiromura, Kanagawa (JP); Sohei Saito, Kanagawa (JP); Hideo Arai, Kanagawa (JP)

(73) Assignee: Johnson Controls Technology Company, Holland, MI (US)

( * ) Notice: Subject to any disclaimer, the term of this patent is extended or adjusted under 35 U.S.C. 154(b) by 68 days.

(21) Appl. No.: 14/395,285

(22) PCT Filed: Apr. 20, 2012

(86) PCT No.: PCT/JP2012/060711
§ 371 (c)(1),
(2), (4) Date: Feb. 20, 2015

(87) PCT Pub. No.: WO2013/157134
PCT Pub. Date: Oct. 24, 2013

(65) Prior Publication Data
US 2015/0151657 A1 Jun. 4, 2015

(51) Int. Cl.
| | |
|---|---|
| *A47C 7/02* | (2006.01) |
| *B60N 2/50* | (2006.01) |
| *B60N 2/68* | (2006.01) |
| *B60N 2/22* | (2006.01) |
| *B60N 2/64* | (2006.01) |

(52) U.S. Cl.
CPC . *B60N 2/50* (2013.01); *B60N 2/22* (2013.01); *B60N 2/64* (2013.01); *B60N 2/68* (2013.01); *B60N 2/682* (2013.01); *B60N 2205/20* (2013.01)

(58) Field of Classification Search
CPC .............. B60N 2/50; B60N 2/22; B60N 2/64; B60N 2/68; B60N 2/682; B60N 2205/20

USPC ............. 297/452.18, 362, 463.1, 463.2
See application file for complete search history.

(56) References Cited

U.S. PATENT DOCUMENTS

| | | | | |
|---|---|---|---|---|
| 3,188,679 A | * | 6/1965 | Wubbe ................ | B60S 1/34 15/250.352 |
| 3,539,234 A | * | 11/1970 | Rapata ................ | F16C 11/06 384/203 |
| 3,589,745 A | * | 6/1971 | Dougherty ........... | B62D 31/006 180/208 |
| 3,760,452 A | * | 9/1973 | Edele .................. | B60S 1/34 15/250.352 |
| 3,801,209 A | * | 4/1974 | Matsuoka ............. | B60G 7/02 16/2.1 |

(Continued)

FOREIGN PATENT DOCUMENTS

| | | |
|---|---|---|
| CN | 1370697 A | 9/2002 |
| CN | 102371926 A | 3/2012 |

(Continued)

OTHER PUBLICATIONS

International Search Report in PCT/JP2012/060711 dated May 29, 2012, 2 pages.

(Continued)

*Primary Examiner* — Laurie K Cranmer
(74) *Attorney, Agent, or Firm* — Foley & Lardner LLP

(57) ABSTRACT

A vehicle seat includes a seat-cushion frame supported on a vehicle body, a fastener fixed to the seat-cushion frame in a lateral direction, an absorption member supported by the fastener inserted in the absorption member, a seat-back frame supported via the absorption member, and a seat back fixed to the seat-back frame.

3 Claims, 5 Drawing Sheets

(56) References Cited

U.S. PATENT DOCUMENTS

| | | | | |
|---|---|---|---|---|
| 4,135,757 | A * | 1/1979 | Smith | B62D 33/0604 296/190.03 |
| 4,619,544 | A * | 10/1986 | Laidely | B60G 5/02 16/2.1 |
| 4,711,497 | A | 12/1987 | Kazaoka et al. | |
| 4,807,330 | A * | 2/1989 | Gomes | A47C 4/40 16/261 |
| 4,883,319 | A * | 11/1989 | Scott | B60N 2/22 16/2.1 |
| 5,024,283 | A * | 6/1991 | Deli | B62D 33/0604 180/89.14 |
| 5,104,190 | A * | 4/1992 | Siegrist | B60N 2/22 297/354.1 |
| 6,032,934 | A * | 3/2000 | Wu | B62J 1/06 267/132 |
| 6,682,252 | B2 * | 1/2004 | Battey | A47C 1/032 297/374 |
| 6,814,522 | B1 * | 11/2004 | Daniel, III | E04F 11/0255 16/273 |
| 7,360,756 | B2 * | 4/2008 | Urquidi | B60G 7/02 267/140.14 |
| 7,997,603 | B2 * | 8/2011 | Petrie | B62J 1/08 267/132 |
| 8,042,823 | B2 * | 10/2011 | Cusack | B62J 1/04 280/281.1 |
| 8,979,199 | B2 * | 3/2015 | Ko | A47C 7/448 297/291 |
| 2004/0025295 | A1 | 2/2004 | Becker et al. | |
| 2005/0179184 | A1 * | 8/2005 | Kojima | B60N 2/206 267/201 |
| 2006/0049007 | A1 * | 3/2006 | Tomita | F16D 55/00 188/73.31 |
| 2010/0014793 | A1 | 1/2010 | Bingert | |
| 2012/0126589 | A1 * | 5/2012 | Kawatani | B62J 1/14 297/195.12 |

FOREIGN PATENT DOCUMENTS

| | | | |
|---|---|---|---|
| EP | 1 378 673 A1 | 1/2004 | |
| JP | 60-081133 S | 6/1985 | |
| JP | 61-005813 A | 1/1986 | |
| JP | 63-115350 | 7/1988 | |
| JP | 03-087441 | 9/1991 | |
| JP | H09-123811 A | 5/1997 | |
| JP | 2006-297982 A | 11/2006 | |
| JP | 2010-221876 | 10/2010 | |
| JP | 2010-264863 A | 11/2010 | |
| JP | 2011-020550 A | 2/2011 | |
| SE | WO 2008073036 A1 * | 6/2008 | B60N 2/0224 |

OTHER PUBLICATIONS

Office Action dated Nov. 13, 2015, in corresponding Chinese application No. 2012800725132, 6 pages.
Extended European Search Report dated Nov. 30, 2015, received in corresponding European application No. 1 287 4584.1, 7 pages.
Office Action dated Jan. 26, 2016, in corresponding Japanese application No. 2014-511056 and English translation, 5 pages.

* cited by examiner

VEHICLE SEAT

CROSS REFERENCE TO RELATED APPLICATIONS

The present application is a U.S. National Stage of International Application No. PCT/JP2012/060711 filed on Apr. 20, 2012, the entire disclosure of which is incorporated herein by reference.

TECHNICAL FIELD

The present invention relates to a vehicle seat.

BACKGROUND ART

As a related vehicle seat, Patent Literature 1 discloses a seat including: side panels arranged on the left and right sides of a seating part of the seat; a front member laid between and fixed to front end portions of the side panels; and a rear member laid between rear end portions of the side panels and fixed to only one of the side panels. Without increasing in weight, this vehicle seat is configured to prevent vibrations of the vehicle body caused by travel from being transmitted to the seat and thereby avoid sympathetic vibrations of the seat (this phenomenon will be referred to as resonance. The same applies hereinafter).

CITATION LIST

Patent Literature

PTL 1: Japanese Unexamined Patent Application Publication No. 2010-221876

SUMMARY OF INVENTION

Here, in such a related technique, a damping effect is achieved by the frameworks such as the side panels, the front member, and the rear member forming the seating part. For this reason, commoditizing of the frameworks of the seating part is not possible. Moreover, a damper is additionally provided to form a free hinge. This makes the weight increased by the weight of the damper, and can be one cause of increase in cost. Also, a cost is required for attachment.

An object of the present invention is to provide a vehicle seat which enables commoditizing of frameworks of a seating part and also is light in weight and capable of significantly reducing the cost.

An aspect of the present invention is a vehicle seat including a seat-cushion frame supported on a vehicle body, a fastener fixed to the seat-cushion frame in a lateral direction, an absorption member supported by the fastener inserted in the absorption member, a seat-back frame supported via the absorption member, and a seat back fixed to the seat-back frame.

The above aspect brings about practical advantages that the frameworks of the seat can be commoditized, that the weight is lighter by the weight of a damper which is not provided, and that it is possible to significantly reduce the cost.

The absorption member may be supported between an inner tube fixed to the seat-cushion frame via the fastener and an outer tube fixed to the seat-back frame and configured to absorb vibrations in the lateral direction.

According to the above aspect, the absorption member absorbs vibrations applied to the seat-cushion frame. Thus, the comfortability can be enhanced significantly.

The absorption member may have a spring constant in a longitudinal direction being five times greater than a spring constant of the absorption member in the lateral direction.

According to the above configuration, vibrations at frequencies of 15 to 20 Hertz (Hz) which are likely to be transmitted to the occupant can be absorbed. Thus, the comfortability can be enhanced significantly.

The absorption member may have a ring shape and be arranged with an axial direction of the absorption member coinciding with the lateral direction.

According to the above configuration, the absorption member is simply inserted between the inner tube and the outer tube. Thus, there is no possibility of incorrect mounting.

DESCRIPTION OF EMBODIMENT

The object of providing a vehicle seat which can enables commoditizing of frameworks of a seating part and also is light in weight and capable of significantly reducing the cost is achieved by including: a seat-cushion frame supported on a vehicle body; a fastener fixed to the seat-cushion frame in a lateral direction; an absorption member supported by the fastener inserted in the absorption member; a seat-back frame supported via the absorption member; and a seat back fixed to the seat-back frame.

Figure 1:
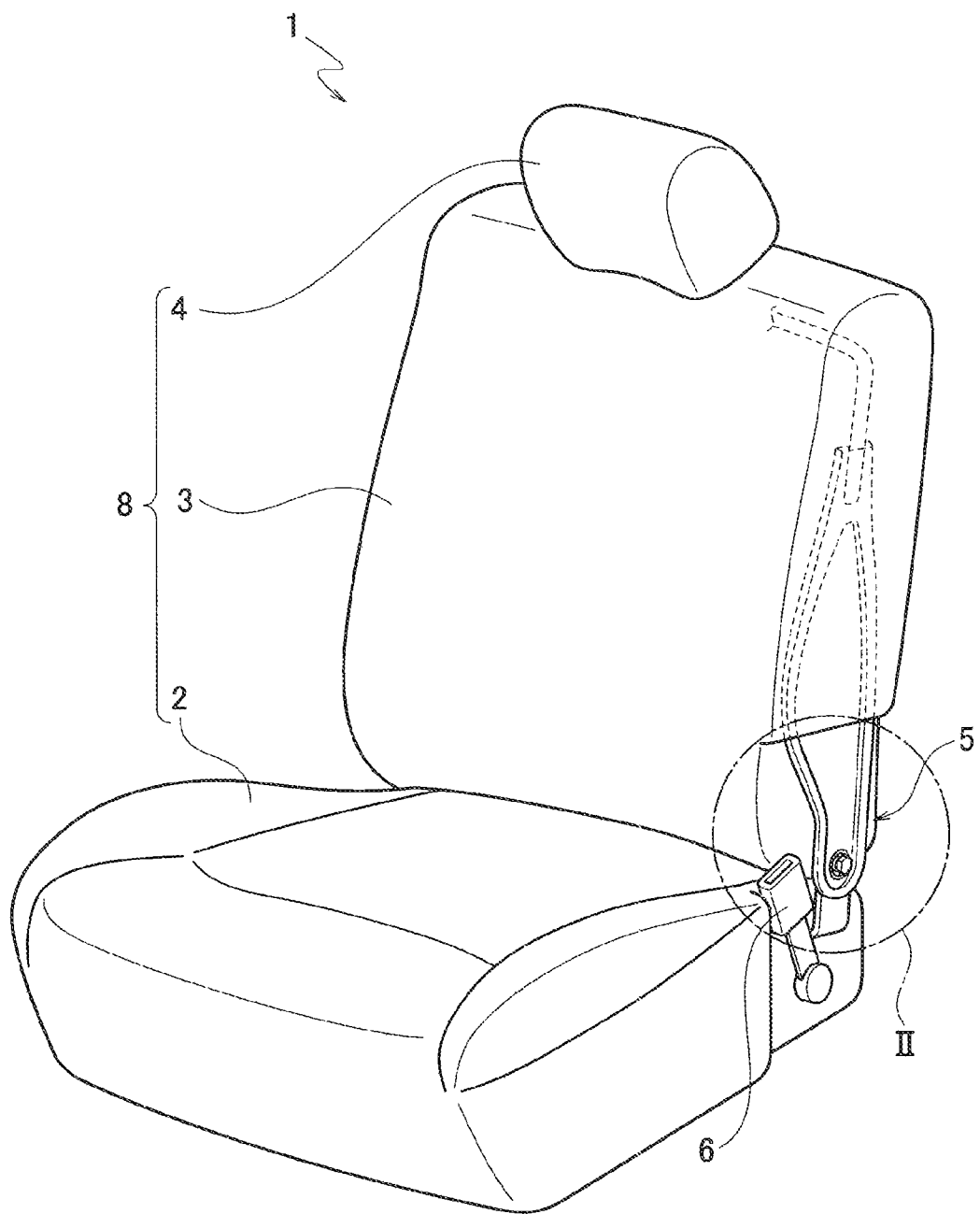
FIG. 1 is a perspective, three-quarter view illustrating a vehicle seat according to one embodiment of the present invention.
Figure 2:
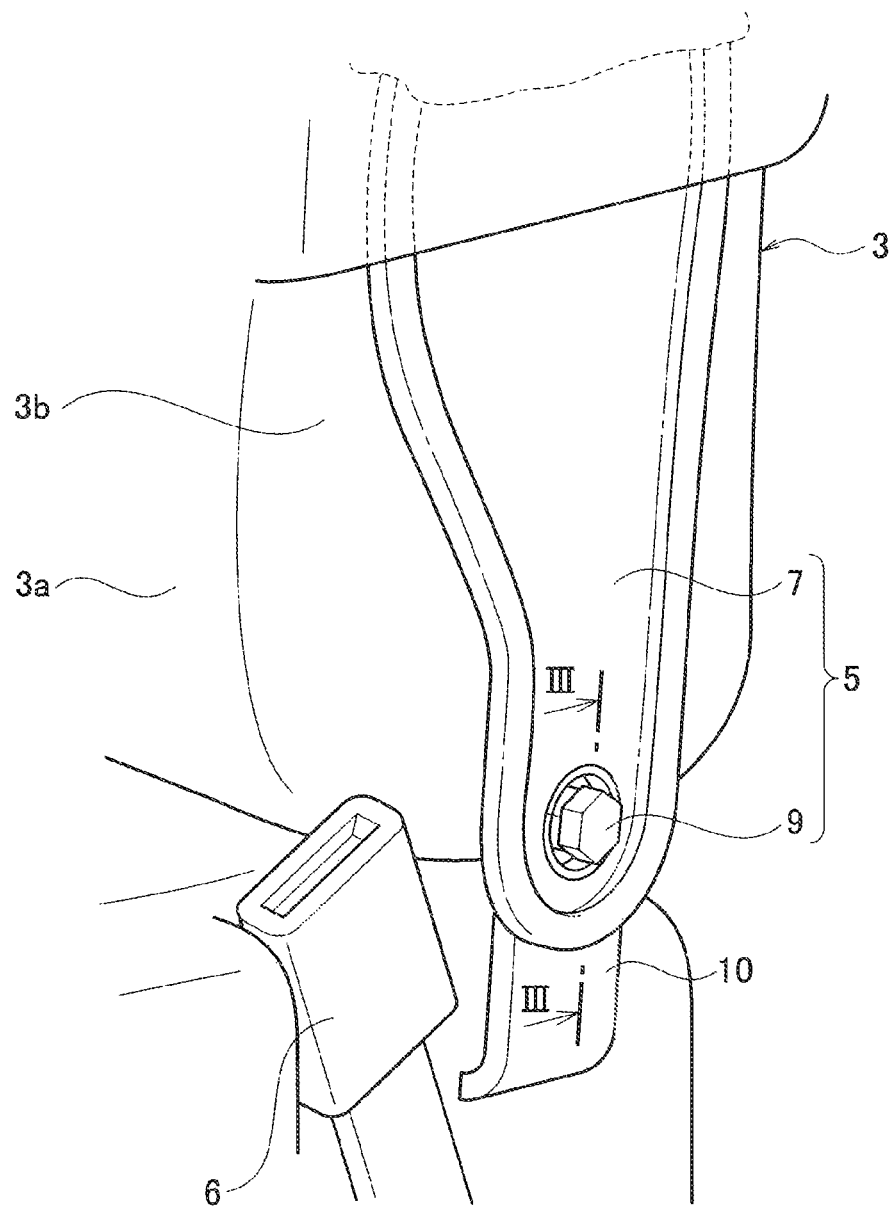
FIG. 2 is an enlarged perspective view of a part II in FIG. 1.

Hereinbelow, one embodiment of the present invention will be described with reference to FIGS. 1 to 4. As illustrated in FIG. 1, a vehicle seat 1 includes a seat cushion 2, a seat back 3, and a head rest 4 as a seat part 8, and support parts 5. The seat cushion 2 is supported on an unillustrated vehicle body with publically known means. The seat back 3 is supported on a frame 10 of the seat cushion 2 via each support part 5. The head rest 4 is supported on the top of the seat back 3.

The support part 5 includes a seat-back frame 7 made of steal and fixed to the seat back 3, and a special bolt 9 serving as a fastener. An upper portion of the seat-back frame 7 is joined to a frame inside the seat back 3 (a dotted line in an upper right area of FIG. 1). The special bolt 9 is fixed to the seat-cushion frame 10 via a lower side (seat cushion 2 side) of the seat-back frame 7.

The special bolt 9 penetrates an absorption member 13 inserted in a hole 7a defined by a flange formed on the seat-back frame 7, and is screwed to a nut 11 fixed to the seat-cushion frame 10. This screwed special bolt 9 is screwed in the same horizontal direction as the left-right, horizontal direction (lateral direction) in FIG. 3. A reinforcement flange 7b is formed at the periphery of the seat-back frame 7. In this embodiment, screwing the special bolt 9 and the nut 11 is employed for the fixing, but a different fixing method may instead be employed.

The seat back 3 has a front surface 3a and side surfaces 3b. The frame 10 exposed from the seat cushion 2 and the seat back 3 are linked and supported by the seat-back frame 7 made of steel. A buckle 6 of a safety belt is supported on the frame 10 of the seat cushion 2. A recessed portion of the seat back 3 on a lower side (around the side surface 3b in FIG. 2) is covered with an unillustrated cover made of resin.

Figure 4:
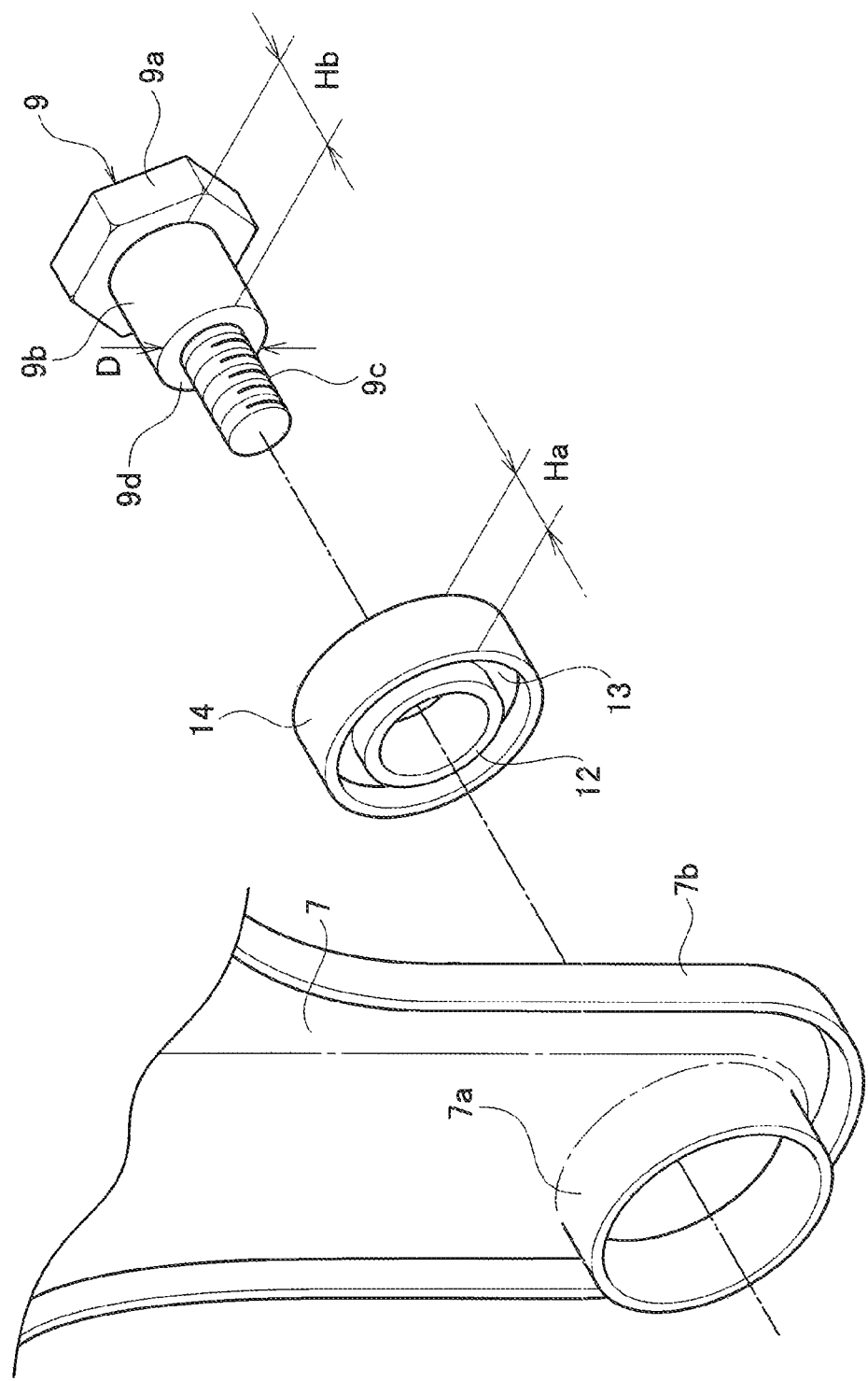
FIG. 4 is an exploded perspective view of FIG. 3.

Details of the support part 5, in particular, the structure around the special bolt 9 will be described in detail. As illustrated in FIG. 4, the special bolt 9 includes a hexagonal head portion 9a, a column portion 9b, and a thread portion 9c. The column portion 9b has a columnar shape with a diameter D of, for example, 13 millimeters and a height Hb of, for example, 9.5 millimeters. The thread portion 9c is screwed to the nut 11 welded to the seat-cushion frame 10. There is a step portion 9d as a step between the column portion 9b and the thread portion 9c.

Figure 3:
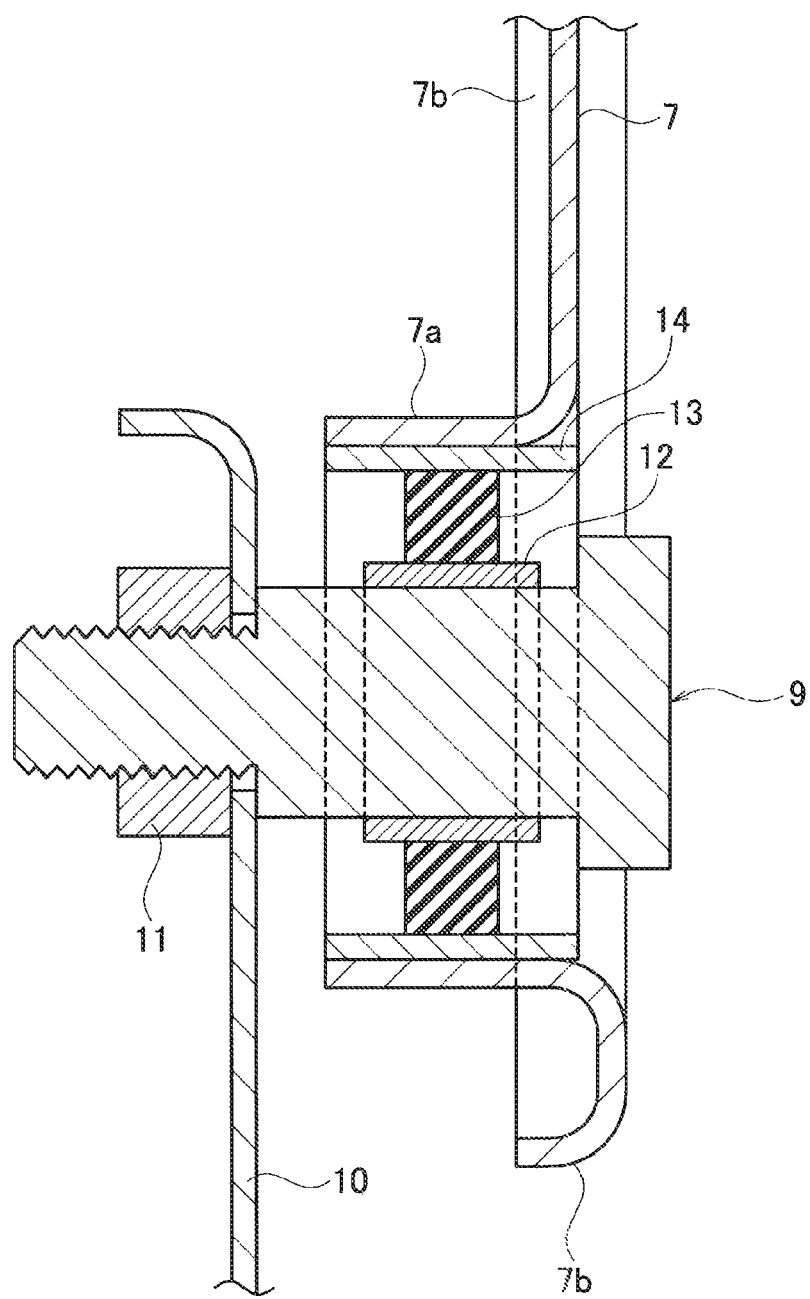
FIG. 3 is an enlarged cross-sectional view taken along a line III-III in FIG. 2.

As illustrated in FIG. 3, the absorption member 13 is interposed between an inner tube 12 and an outer tube 14. The inner tube 12 is synthetic resin formed in a ring shape with an inner diameter of, for example, 13.1 millimeters, an outer diameter of, for example, 17.1 millimeters, and a height Ha of, for example, 11 millimeters. The outer tube 14 is steel formed in a right shape with an outer diameter of, for example, 30 millimeters, a height Ha of, for example, 11 millimeters, and a thickness of, for example, 1.6 millimeters. The absorption member 13 is arranged with its axial direction coinciding with the axial direction of the special bolt 9 (the left-right, horizontal direction in FIG. 3; the lateral direction).

The absorption member 13 is a rubber product interposed between the inner tube 12 and the outer tube 14. The spring constant in the direction perpendicular to the axis is 250, while the spring constant in the axial direction is 50.

Next, the operation of this embodiment will be described.

The vehicle seat 1 according to this embodiment includes: the frame 10 of the seat cushion 2 supported on the unillustrated vehicle body; the special bolt 9 screwed to the frame 10 of the seat cushion 2 in the horizontal direction; the absorption member 13 supported by the special bolt 9 inserted thereto; the seat-back frame 7 supported via the absorption member 13; and the seat back 3 fixed to the seat-back frame 7. In this way, the frame 10 of the seat cushion 2 and the seat-back frame 7 of the seat back 3 which are frameworks of the vehicle seat 1 can be commoditized. Thus, a damper as employed in conventional techniques can be omitted. This makes the weight lighter accordingly, and brings about a practical advantage that the cost can be reduced significantly.

The absorption member 13 is fixed between the inner tube 12, which is fixed to the frame 10 of the seat cushion 2 via the special bolt 9, and the outer tube 14 fixed to the seat-back frame 7 of the seat back 3. In this way, the absorption member 13 absorbs vibrations applied to the frame 10 of the seat cushion 2. Thus, the comfortability can be improved significantly.

Figure 5:
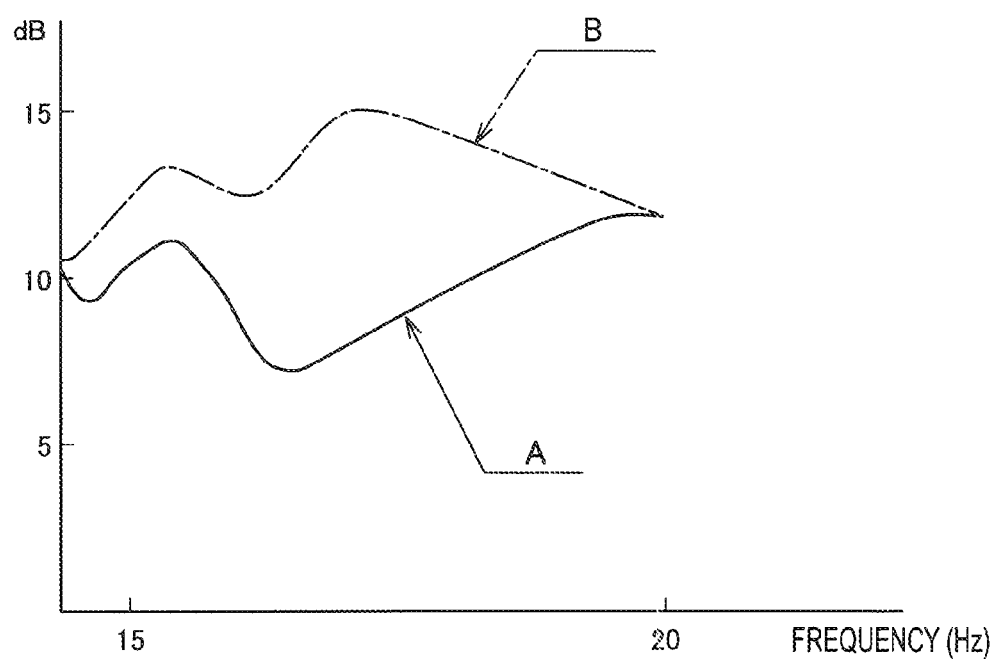
FIG. 5 is data on vibrations of the vehicle seat according to the one embodiment of the present invention relative at given frequencies, illustrated in comparison with a related technique.

In FIG. 5, A illustrates the relationship between frequencies and vibrations in the vehicle seat 1 according to the one embodiment of the present invention, while B illustrates the relationship between frequencies and vibrations in a related technique. The spring constant of the absorption member 13 in the direction perpendicular to the axis (longitudinal direction) is 250—a spring constant approximately five times greater than the spring constant in the axial direction (lateral direction) which is 50. Thus, as illustrated in FIG. 5, vibrations at frequencies from 15 to 20 Hz which are likely to be transmitted to the occupant can be absorbed. Accordingly, the comfortability can be improved significantly.

In the above embodiment, the vehicle seat is described by taking a seat for an automobile as an example. However, the present invention is not limited to this example and may be a seat mounted on an aircraft, a train, a ship, or the like.

Although the embodiment of the present invention has been described above, the present invention is not limited to the above embodiment, and various changes can be made thereto.

The invention claimed is:

1. A vehicle seat, comprising:
    a seat-cushion frame supported on a vehicle body;
    a seat-back frame;
    a seat back fixed to the seat-back frame;
    a bolt fixed to the seat-cushion frame in a lateral direction;
    an inner tube fixed to the bolt;
    an outer tube fixed to the seat-back frame; and
    an absorption member supported by the inner tube and the outer tube between the inner tube and the outer tube,
    wherein the seat-cushion frame and the seat-back frame are in indirect contact with each other such that any vibration in the seat-cushion frame must pass through the absorption member before reaching the seat-back frame, and
    wherein the absorption member is configured to absorb vibrations in the lateral direction.

2. The vehicle seat according to claim 1, wherein the absorption member has a spring constant in a longitudinal direction being five times greater than a spring constant of the absorption member in the lateral direction.

3. The vehicle seat according to claim 1, wherein the absorption member has a ring shape and is arranged with an axial direction of the absorption member coinciding with the lateral direction.

* * * * *